(12) United States Patent
Colasanto

(10) Patent No.: US 9,222,611 B2
(45) Date of Patent: Dec. 29, 2015

(54) FLEXIBLE BARRIER COMPOSITE FABRICS VIA AN ADHERED FILM PROCESS

(75) Inventor: Thomas C. Colasanto, Tolland, CT (US)

(73) Assignee: Dartex Coatings, Inc., Slatersville, RI (US)

( * ) Notice: Subject to any disclaimer, the term of this patent is extended or adjusted under 35 U.S.C. 154(b) by 27 days.

(21) Appl. No.: 14/008,816

(22) PCT Filed: Mar. 30, 2012

(86) PCT No.: PCT/US2012/031483
§ 371 (c)(1),
(2), (4) Date: Sep. 30, 2013

(87) PCT Pub. No.: WO2012/135634
PCT Pub. Date: Oct. 4, 2012

(65) Prior Publication Data
US 2014/0261972 A1    Sep. 18, 2014

Related U.S. Application Data

(60) Provisional application No. 61/469,408, filed on Mar. 30, 2011.

(51) Int. Cl.
*B29C 73/00* (2006.01)
*B32B 43/00* (2006.01)
(Continued)

(52) U.S. Cl.
CPC . *F16L 55/18* (2013.01); *B32B 1/08* (2013.01); *B32B 5/02* (2013.01); *B32B 5/022* (2013.01); *B32B 5/024* (2013.01); *B32B 5/026* (2013.01); *B32B 7/12* (2013.01); *B32B 25/10* (2013.01); *B32B 27/12* (2013.01); *B32B 27/34* (2013.01); *B32B 27/36* (2013.01); *B32B 27/40* (2013.01); *B32B 37/025* (2013.01); *B32B 43/00* (2013.01);
(Continued)

(58) Field of Classification Search
CPC ........ B32B 27/12; B32B 27/08; B32B 27/40; B32B 5/00; B32B 5/02; B32B 5/22; B32B 5/24; B32B 7/12; B32B 2307/724; B32B 37/12; B32B 2255/02; B32B 2255/26; B32B 25/00; B32B 25/10; B32B 1/08; B32B 2597/00; Y10T 428/1362; Y10T 428/1334; Y10T 428/1307; Y10T 428/13; Y10T 428/1314; Y10T 428/1317; Y10T 428/1321; F16L 55/1656
USPC .............. 156/60, 71, 94, 196, 217, 218, 293, 156/294, 296, 307.1, 307.3, 307.7; 428/34.1, 35.2, 35.4, 35.7, 36.1, 36.6, 428/36.7, 36.8, 36.9, 36.91, 221, 304.4, 428/305.5, 317.1, 317.3, 320.1; 442/286, 442/181, 304, 327, 394
See application file for complete search history.

(56) References Cited

U.S. PATENT DOCUMENTS 4,600,615 A  *  7/1986  Hyodo et al. ................. 138/125
4,602,792 A  *  7/1986  Andrick ........................ 277/615

*Primary Examiner* — Philip Tucker
*Assistant Examiner* — Brian R Slawski
(74) *Attorney, Agent, or Firm* — Caeser Rivise, PC

(57) ABSTRACT

A composite fabric includes: a fabric backing; an adhesive layer; a midlayer barrier bonded to the fabric backing by the adhesive layer; and an external barrier bonded to the midlayer barrier, wherein the composite fabric has a hydrostatic pressure resistance of at least 100 psi and is sufficiently flexible such that it can be formed into a tube and everted. A process and an apparatus for producing the composite fabric are also disclosed. The composite fabric is particularly suitable for use as a liner in a cured-in-place pipe repair method.

25 Claims, 2 Drawing Sheets

(51) Int. Cl.
*B29C 65/00* (2006.01)
*B32B 37/00* (2006.01)
*B29D 22/00* (2006.01)
*B29D 23/00* (2006.01)
*B32B 1/08* (2006.01)
*B60R 21/16* (2006.01)
*B32B 27/08* (2006.01)
*F16L 11/04* (2006.01)
*B32B 7/12* (2006.01)
*B32B 27/12* (2006.01)
*F16L 55/18* (2006.01)
*B32B 5/02* (2006.01)
*B32B 25/10* (2006.01)
*B32B 27/34* (2006.01)
*B32B 27/36* (2006.01)
*B32B 27/40* (2006.01)
*F16L 55/165* (2006.01)

(52) U.S. Cl.
CPC ......... *F16L 55/1656* (2013.01); *B32B 2255/02* (2013.01); *B32B 2255/26* (2013.01); *B32B 2274/00* (2013.01); *B32B 2307/50* (2013.01); *B32B 2597/00* (2013.01); *Y10T 156/15* (2015.01); *Y10T 428/1362* (2015.01); *Y10T 442/3862* (2015.04); *Y10T 442/40* (2015.04); *Y10T 442/675* (2015.04)

FLEXIBLE BARRIER COMPOSITE FABRICS VIA AN ADHERED FILM PROCESS

BACKGROUND OF THE INVENTION

1. Field of Invention

This invention relates to the manufacture of flexible coated fabrics with high barrier properties.

2. Description of Related Art

The attachment of polymeric coatings to flexible webs (e.g. fabrics) to provide a flexible composite with barrier properties, for example waterproofness, is well known. Existing methods typically employed to produce such composites from flexible webs include the lamination of pre-formed films (laminating), such as taught in, e.g., U.S. Pat. Nos. 5,709,766 and 5,902,753; the direct application of liquid coating compositions followed by drying and/or curing (direct coating), such as taught in, e.g., U.S. Pat. Nos. 5,902,753 and 6,734,123; and the application of liquid coating compositions to a temporary carrier having release properties, followed by drying and/or curing before being transferred from the carrier and adhered to the substrate web (transfer coating), such as taught in, e.g., U.S. Pat. No. 4,233,358. A fourth method related to direct coating, involves the direct application of molten polymer to a flexible web, followed simply by cooling (extrusion coating). Each method has its inherent advantages and disadvantages, summarized in Table 1 below.

TABLE 1

Composite Fabric Manufacturing Methods

| Method | Advantages | Disadvantages |
|---|---|---|
| Lamination | Economical<br>Low emission processing<br>Leak-proof via thick or multilayer construction | Narrow formulating latitude |
| Direct Coating | Moderately economical<br>Wide formulating latitude | Not well suited to stretch, or bulky fabrics Difficult to attain leakproofness |
| Transfer Coating | Wide formulating latitude<br>Suitable for high stretch and bulky fabrics | Expensive<br>Requires multi-station coating to attain leakproofness |
| Extrusion Coating | Economical<br>Low emission processing<br>Leak-proof via thick or multilayer construction | Narrow formulating latitude |

Dartex Coatings, Inc., a well-established coater and laminator of textiles which is located in Slatersville, R.I., supplies polyurethane (PU) coated liner fabric to the sewer pipe rehabilitation market where its customers fashion it into tubular form, saturate its fabric side with a curable resin, line a damaged host pipe with the saturated fabric and then allow it to cure, thereby repairing the host pipe and restoring service through the host pipe in a manner which is more economical and less disruptive than the alternative method of digging a trench and replacing the pipe section. This useful technology is commonly referred to as "trenchless" cured-in-place pipe (CIPP) rehabilitation.

The liner fabric requires a modest amount of liquid barrier properties along with good resin saturation and resin holding capability on its uncoated surface. This combination of properties is easily obtained using Dartex's current transfer coating line where a temporary, release paper carrier is coated with a PU solution, dried, then overcoated in-line with an adhesive solution, into which a high pile knit fabric is introduced. Finally, the adhesive layer is dried and upon cooling the composite fabric is stripped free of the paper carrier, yielding the coated fabric. Produced in this manner, and by virtue of the following balance of properties, Dartex's liner fabrics have enjoyed success in the gravity-driven, sewer pipe rehabilitation market:

- Good resin saturation receptivity combined with resin holding capacity and control
- Excellent controlled stretch and flexibility
- Good overall durability, especially towards the liner installation process while resin-saturated
- Decent barrier properties A relatively recent goal of Dartex is to expand its market into liners suitable for pipes that transport water or other liquids under relatively high pressure, including those transporting potable water. In order to satisfy this more demanding application, these pressure pipe liners would need to ensure a much higher degree of liquid barrier properties (e.g., waterproofness) and robustness, not to mention the process latitude allowing for barrier layer composition and thickness variability to meet each pipe rehabilitation situation.

Achieving this goal on a transfer coating line having only two coating stations poses a difficult challenge. In fact, since the "barrier" layer would have to be cast from solution at the first, single coating head, there would be severe limits imposed on the maximum thickness attainable, not to mention that it would be nearly impossible to guarantee substantially leakproof quality when depending upon just one layer. (It should be noted that the second, adhesive layer in practice does not contribute significantly to barrier properties, presumably since the introduced fabric layer protrudes into and through it while wet.)

Accordingly, there exists a desire to devise a transfer-coating process that will enable the production of composite fabrics having barrier layers of variable composition and thicknesses with substantially leakproof characteristics. It is further desired that such composite fabrics be sufficient flexible for use in CIPP repair.

All references cited herein are incorporated herein by reference in their entireties.

BRIEF SUMMARY OF THE INVENTION

Accordingly, a first aspect of the invention is a composite fabric comprising: a fabric backing; an adhesive layer; a midlayer barrier bonded to the fabric backing by the adhesive layer; and an external barrier bonded to the midlayer barrier, wherein the composite fabric has a hydrostatic pressure resistance of at least 100 psi and is sufficiently flexible such that it can be formed into a tube and everted.

In certain embodiments of the composite fabric, the fabric backing is a knit, woven or non-woven fabric which is stretchable in at least one of a machine direction and a cross-machine direction.

In certain embodiments of the composite fabric, the adhesive layer comprises a polyurethane composition.

In certain embodiments of the composite fabric, the midlayer barrier comprises an aromatic polyether polyurethane composition.

In certain embodiments of the composite fabric, the external barrier comprises a layer of a pre-formed polymeric film selected from the group consisting of an extruded thermoplastic polyurethane film, a polyester film, a natural or synthetic rubber film, a polyamide film and a polyolefin film.

In certain embodiments of the composite fabric, the composite fabric further comprises at least one additional external barrier bonded to the external barrier.

In certain embodiments of the composite fabric, the hydrostatic pressure resistance is at least 150 psi.

In certain embodiments of the composite fabric, the hydrostatic pressure resistance is 100-200 psi.

In certain embodiments of the composite fabric, the composite fabric is tubular in form and suitable for use as a liner for cured-in-place pipe repair.

A second aspect of the invention is a process for producing the composite fabric, said process comprising: feeding a release carrier to a transfer coating line having at least two coating stations; applying at only a single coating station a midlayer barrier coating solution to the release layer to form the midlayer barrier; applying an adhesive to the midlayer barrier on the release layer; applying the fabric backing to the adhesive on the midlayer barrier to form a first intermediate; heating the first intermediate to form a second intermediate; separating the release carrier from the second intermediate to form a third intermediate; and providing the external barrier by applying a barrier film to the midlayer barrier of the third intermediate to form the composite fabric.

In certain embodiments of the process, the fabric backing is a knit, woven or non-woven fabric which is stretchable in at least one of a machine direction and a cross-machine direction.

In certain embodiments of the process, the adhesive comprises a polyurethane composition.

In certain embodiments of the process, the midlayer barrier comprises an aromatic polyether polyurethane composition.

In certain embodiments of the process, the external barrier comprises a layer of a pre-formed polymeric film selected from the group consisting of an extruded thermoplastic polyurethane film, a polyester film, a natural or synthetic rubber film, a polyamide film and a polyolefin film.

In certain embodiments of the process, there is at least one further step of bonding at least one additional external barrier to the external barrier.

In certain embodiments of the process, the hydrostatic pressure resistance is at least 150 psi.

In certain embodiments of the process, the hydrostatic pressure resistance is 100-200 psi.

A third aspect of the invention is an apparatus adapted to produce the composite fabric, said apparatus comprising a coating station to apply a midlayer barrier coating solution to a release layer and a coating station to apply an adhesive to the midlayer barrier, wherein the apparatus requires no other coating stations.

A fourth aspect of the invention is a liner for cured-in-place-pipe repair, said liner comprising the composite fabric in a tubular form.

A fifth aspect of the invention is a cured-in-place-pipe repair method comprising: forming a tubular liner from the composite fabric of claim 1, such that the fabric backing constitutes an external surface of the tubular liner; applying a curable resin to the fabric backing to provide a coated tubular liner; inserting the coated tubular liner into a pipe to be repaired; and maintaining contact between the coated tubular liner and an internal surface of the pipe while the resin cures such that the pipe is repaired.

In certain embodiments of the method, the fabric backing is a knit, woven or non-woven fabric which is stretchable in at least one of a machine direction and a cross-machine direction.

In certain embodiments of the method, the adhesive comprises a polyurethane composition.

In certain embodiments of the method, the midlayer barrier comprises an aromatic polyether polyurethane composition.

In certain embodiments of the method, the external barrier comprises a layer of a pre-formed polymeric film selected from the group consisting of an extruded thermoplastic polyurethane film, a polyester film, a natural or synthetic rubber film, a polyamide film and a polyolefin film.

In certain embodiments of the method, there is at least one further step of bonding at least one additional external barrier to the external barrier.

In certain embodiments of the method, the hydrostatic pressure resistance is at least 150 psi.

In certain embodiments of the method, the hydrostatic pressure resistance is 100-200 psi.

BRIEF DESCRIPTION OF SEVERAL VIEWS OF THE DRAWINGS

The invention will be described in conjunction with the following drawings, wherein.

DETAILED DESCRIPTION OF PREFERRED EMBODIMENTS OF THE INVENTION

The invention enables two-coating-station transfer coating lines to produce substantially leakproof composite fabrics having barrier layers of variable composition and thicknesses. At least one additional barrier layer can be adhered, in-line, and at a point after a more or less conventionally transfer-coated barrier fabric is stripped free from its release carrier. Using this method, all of the beneficial and well-established properties of the liner fabric can be preserved, while achieving greatly enhanced overall barrier properties (e.g. leakproofness, installation-time durability, and durability-in-use). Since the additional barrier layer(s) can be selected from a relatively wide array of pre-formed commercially available films, the overall barrier thickness can be conveniently controlled and widely varied.

Advantages of the invention include:
Yields substantially leakproof barrier fabrics by virtue of a multi-layer barrier construction.
Requires liquid coating application at only two (vs. three or more) stations of a conventional transfer-coating line.
Conveniently accommodates the use of commercially available barrier films of varied composition and thickness, including NSF certified films for potable water systems.
Provides improved economy over conventionally transfer-coated fabric on an equivalent barrier thickness basis.
Provides an efficient process for the production of CIPP liner fabrics useful for gravity and pressure-pipe applications, including those transporting potable water. Said liner fabrics having good resin receptivity and holding capability; good stretch characteristics and flexibility; durability to handling and use; and high resistance to leakage from liquids under pressure.

Process and Apparatus for Preparing Composite Barrier Fabric

Figure 1:
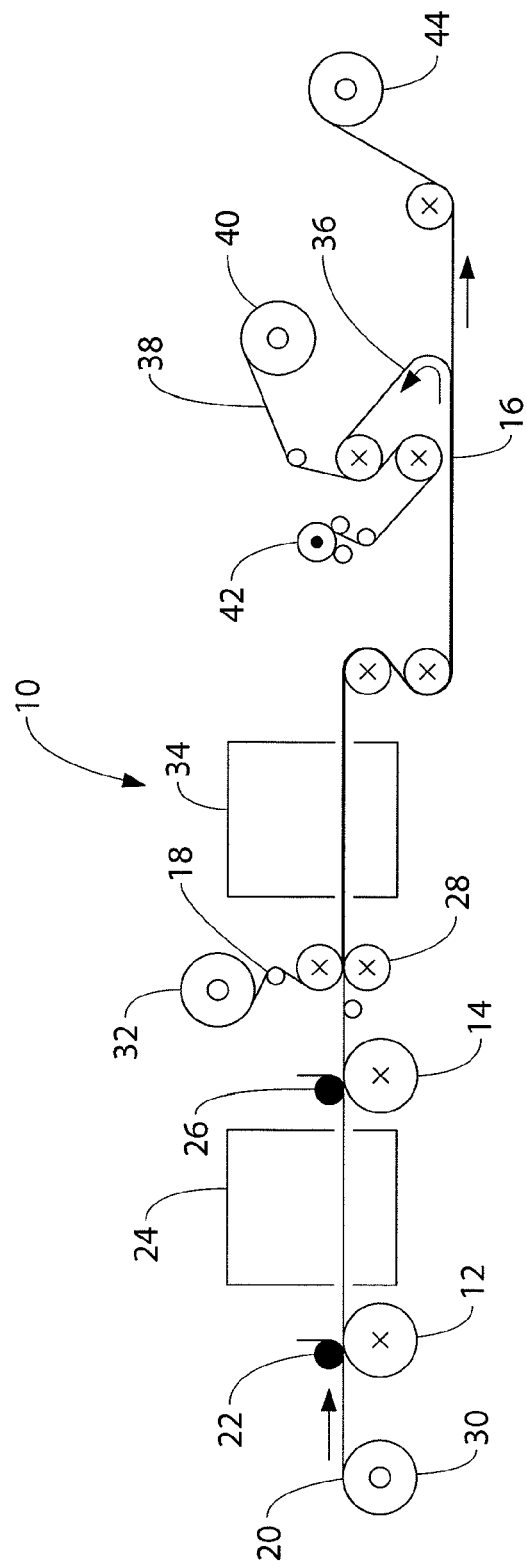
FIG. 1 shows a schematic view of an embodiment of a transfer coating line apparatus and process of the invention.

Referring to FIG. 1, the inventive process is preferably conducted on a transfer coating line 10 having at least two coating stations 12, 14 and heated nip station 16 at a point in the path between where the coated intermediate product is stripped from its release carrier 20 and where it is ultimately rewound.

The release carrier is preferably a web having sufficient heat and chemical resistance, dimensional stability, and release characteristics, to be compatible with the process.

Non-limiting examples of suitable materials for the release carrier include casting papers; release-coated plastic film; polyester film; and oriented polypropylene film. Particularly preferred is a 2 mil silicone-coated polyester release liner available from MN Release LLC under the product code 2MIL PET C/1/S EASY RELEASE.

Carrier web 20 having suitable release properties is unwound from release carrier supply 30 to first knife-over-roll coating station 12, where a midlayer compound 22 is applied as a continuous layer to provide a midlayer of desired thickness.

The coated web proceeds through dryer 24 where the midlayer is dried, providing a first barrier layer. The temperature within dryer 24 may vary from ambient to 400° F., with dwell time dependent upon the composition of the wet midlayer.

The web proceeds to second knife-over-roll coating station 14, where liquid adhesive compound 26 is applied to a desired thickness before entering gapped nip station 28 where suitable fabric backing 18 from an independent unwind station 32 is introduced.

Proceeding through dryer 34, the adhesive is allowed to sufficiently dry and/or cure, setting the fabric backing to the cast midlayer barrier. The temperature within dryer 34 may vary from ambient to 400° F., with dwell time dependent upon the composition and cure chemistry of the liquid adhesive.

The composite fabric intermediate 36 is then peeled from release carrier 20 and its path is diverted into a heated and pressured nip 16 as it meets additional pre-formed, external barrier film 38 being fed from a separate unwind station 40. In this step, external barrier film 38 is brought into intimate contact with the midlayer and effectively fused to it during its period of contact with the heated roller.

Nip 16 is preferably set at a temperature from ambient to 500° F., dependent on the fusion characteristics of the pre-formed barrier film towards the midlayer. Dwell time varies in response to nip temperature and pressure along with fusion characteristics of the pre-formed barrier film towards the midlayer.

The heated nip may be replaced with cold nip, and if needed, followed or preceded by any alternative source of thermal energy, such as an IR heater.

The completed composite barrier fabric 42 is finally rewound into rolls. The carrier web is rewound separately on release carrier rewind roller 44 for potential re-use.

Composite Barrier Fabric

Figure 2:
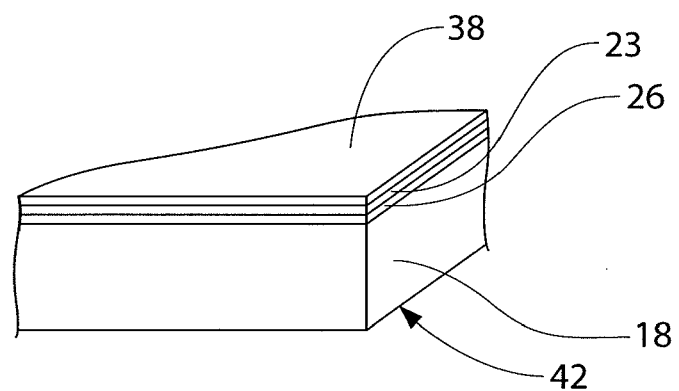
FIG. 2 shows a schematic view of an embodiment of the composite barrier fabric of the invention.

FIG. 2 shows an embodiment of a composite barrier fabric resulting from the inventive process. Elements of the composite barrier fabric of FIG. 2 include fabric backing 18, adhesive 26, midlayer barrier 23 and external barrier film 38.

Fabric backing 18 is preferably a high pile knit construction to impart flexibility, stretch, and resin absorption qualities, particularly for CIPP liner applications. Suitable fabric backing materials include but are not limited to all types of knit, woven or non-woven fabrics exhibiting significant stretch in either machine or cross-machine direction, or both. Non-limiting examples include: napped circular knits; warp knits; sliver knit; stretch wovens; and stretch non-wovens. Particularly preferred is a polyester high pile knit available from Draper Mills under the product code FPL0007330011.25020HS0.

It is anticipated that the simultaneous introduction of open weave scrims or possibly a network of yarns, during the introduction of the backing fabric to the adhesive layer, may be useful.

Adhesive layer 26 is adapted to durably bond fabric backing 18 to midlayer barrier 23. Suitable adhesives include both "wet" and "dry" laminating adhesives. Non-limiting examples of suitable adhesives include polyurethane solutions, polyurethane aqueous dispersion adhesives; polyester adhesives; polyacrylate adhesives; polyamide adhesives; natural or synthetic rubber adhesives; and silicone adhesives. Most preferably, adhesive 26 is an aqueous compound of an aliphatic polyurethane with a polyisocyanate curative, such as EAF525-16, available from Dartex Coatings Inc.

Adhesive 26 has a preferred thickness of 0.0002" to 0.0030" (when dried). This layer may be continuous as described above, or discontinuous (i.e., patterned), or expanded (e.g., foam).

Midlayer barrier 23 contributes to leakproofness and is capable of adhering durably to external barrier film 38. The midlayer barrier is preferably a liquid coating composition capable of forming films, having barrier properties towards liquids and/or gases, while having receptivity towards fusion with the external barrier film. Most preferably, midlayer barrier is an aromatic polyether polyurethane composition, such as EAF535-1, which is available from Dartex Coatings Inc.

Midlayer barrier 23 has a preferred thickness of 0.0002" to 0.0030" (when dried).

External barrier film 38 comprises a layer of pre-formed barrier film having preselected thickness and composition, and serves as the primary barrier layer. Suitable materials for the external barrier film include but are not limited to flexible, thermoplastic pre-formed polymeric films exhibiting good barrier properties towards liquids and/or gases that exhibit good fusion with the midlayer barrier under conditions of heat and pressure. Non-limiting examples include: extruded thermoplastic polyurethane film; polyester film; natural or synthetic rubber film; polyamide film; and polyolefin film.

External barrier film thicknesses of 0.00025" to 0.25000" are preferred, and multiple barrier films may be added simultaneously or individually in series.

Composite fabrics (and liner tubes) of the invention preferably have a hydrostatic pressure resistance of at least 10 psi or at least 50 psi or at least 100 psi or at least 150 psi. The maximum hydrostatic pressure resistance is not particularly critical, but in certain embodiments, is 500 psi or 400 psi or 300 psi or 200 psi or 150 psi. Suitable hydrostatic pressure resistance ranges include but are not limited to 10-500 psi or 50-400 psi or 100-200 psi or any other combination of minimum and maximum hydrostatic pressure resistance values given in this paragraph.

The expression "hydrostatic pressure resistance" as used herein refers to a pounds per square inch value as determined by ASTM D751, Procedure B.2, unless otherwise specified.

Liner Tube

Figure 3:
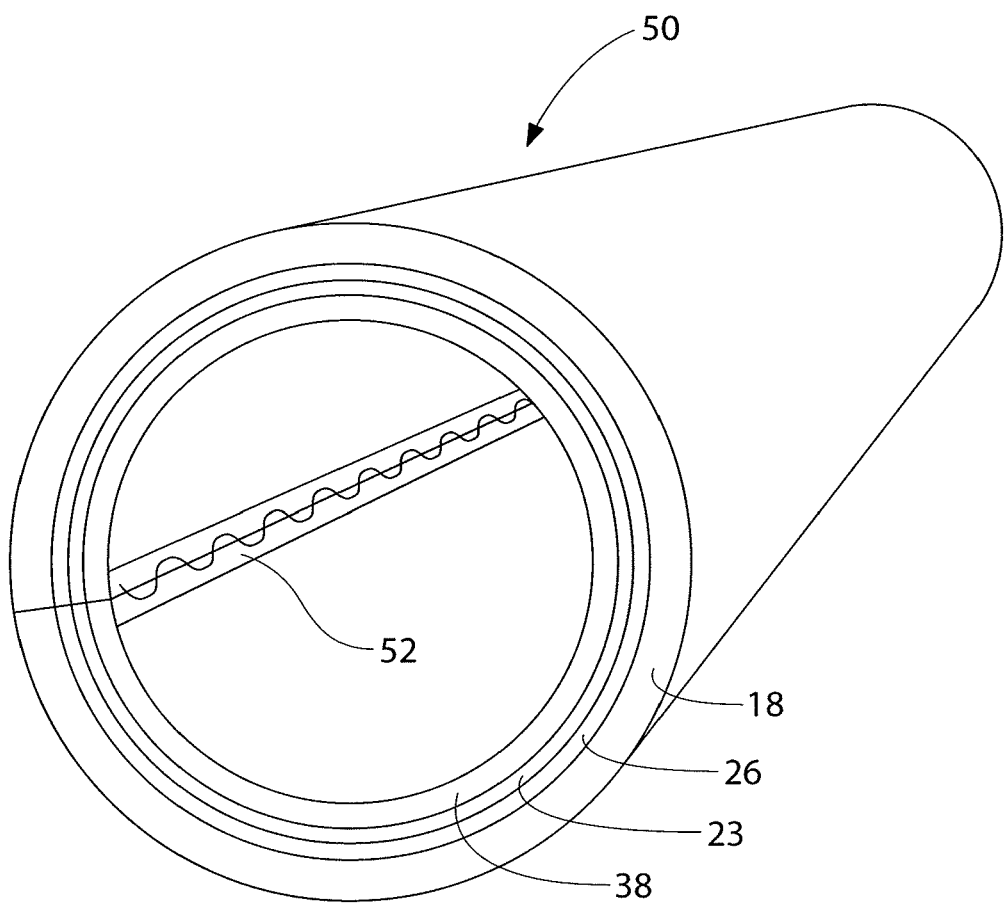
FIG. 3 shows a perspective view of an embodiment of a liner tube of the invention.

An important aspect of this invention comprises the fabrication of tubular liners for the trenchless rehabilitation of pipelines, such as, e.g., sewer (gravity) pipelines, and pressurized liquid supply pipelines, including those supplying potable water. FIG. 3 shows an example of such a liner tube 50, fashioned from the barrier composite fabric produced by the above process.

The initially flat composite fabric 42, such as that depicted in FIG. 2, is slit to a predetermined width and joined edge-to-edge to form a tube of pre-determined length, typically by sewing. In preferred embodiments, the sewn seam is then sealed using seam tape 52 (e.g., thermoplastic tape) which is applied either in a semi-molten state, or after surface-activation by solvent. The resulting liquid-impervious tube can then be saturated on its absorbent fabric surface with a liquid curable resin system (e.g., 2-part epoxy) and installed into a damaged host pipe. Here it is typically held against the host pipe surface through the use of a temporary expanding bladder (not shown) until the resin system achieves sufficient hardness, cure, and adhesion to the host pipe.

Although the method of cured-in-place, trenchless pipe repair is well known, it is believed that liners having a superior combination of conformability, leakproofness and durability are achievable through the inventive process described above.

The invention will be illustrated in more detail with reference to the following Examples, but it should be understood that the present invention is not deemed to be limited thereto.

EXAMPLE 1

Composite fabrics, based on a high pile sliver knit useful for the cured-in-place lining of gravity and pressure pipes including potable water pipes, were produced using the apparatus and process shown in FIG. 1. Tables 2 and 3, which follow, specify the materials and process variables used.

TABLE 2

Materials

| Material | Description | Product Code | Supplier |
|---|---|---|---|
| Release Carrier | 2 mil Silicone-Coated Polyester Release Liner | 2MIL PET C/1/S EASY RELEASE | MPI Release LLC |
| Midlayer Barrier Coating Solution | Solution Compound of Aromatic Polyether Polyurethane | EAF535-1 | Dartex Coatings Inc. |
| Liquid Adhesive | Aqueous Compound of Aliphatic Polyurethane with Polyisocyanate Curative | EAF525-16 | Dartex Coatings Inc. |
| Fabric Backing | Polyester High Pile Sliver Knit | FPL0007330011.25020HS0 | Draper Mills |
| Barrier Film | 2 mil Aromatic Polycarbonate Polyurethane Film | 137 Matte × 0.002" | Tuftane ETI |

TABLE 3

Process Variables

| Process Variable | Controlled Variable | Value | Notes |
|---|---|---|---|
| Midlayer Thickness | Applied (dry) weight, oz/yd$^2$ | 0.65 | |
| Drying (Dryer #1) | Temperature, °F./Dwell, s | 200/180 | |
| Liquid Adhesive Thickness | Applied (dry) weight, oz/yd$^2$ | 1.20 | |
| Drying (Dryer #2) | Temperature, °F./Dwell, s | 250/120 | |
| Heated Nip | Temperature, °F./Pressure, pli | 275/70 | Heat applied to lower nip roller depicted in FIG. I, only. |
| Heated Nip Roller Dwell | Contact Path Length, yds/ Line Speed, ypm | 0.52/6 | ~5 Seconds dwell. |

Table 4 below represents the results of physical testing performed on the composite barrier fabric manufactured as described above.

TABLE 4

Test Results

| Property | Value | Method |
|---|---|---|
| Weight, oz/yd$^2$ 23 ASTM D751 | 23 | ASTM D751 |
| Thickness, mm | 6 | ASTM D751 |
| Adhesion of Coating, pfi | 9 | ASTM D751 |
| Stretch, %, MD × CD | 8 × 19 | ASTM D6614 |
| Growth, %, MD × CD | 1.2 × 2.3 | ASTM D6614 |
| Hydrostatic Resistance | No Leakage, 5' @ 1000, mbar | ASTM D751, Procedure B.2 |
| Cold Potable Water Suitability | Pass (Up to 135 in$^2$/L (both sides contacted) or 39 in$^2$/L (barrier side contacted)) | ANSI/NSF61 2010a, Section 5 |

EXAMPLE 2

Another high pile based composite fabric employing a thicker barrier layer useful for the cured-in-place lining of gravity and pressure-pipes, was produced using the apparatus and process shown in FIG. 1. Tables 5 and 6, which follow, specify the materials and process variables used.

TABLE 5

Materials

| Material | Description | Product Code | Supplier |
|---|---|---|---|
| Release Carrier | 2 mil Silicone-Coated Polyester Release Liner | 2MIL PET C/1/S EASY RELEASE | MPI Release LLC |
| Midlayer Barrier Coating Solution | Solution Compound of Aromatic Polyether Polyurethane | EAF535-1 | Dartex Coatings Inc. |
| Liquid Adhesive | Aqueous Compound of Aliphatic Polyurethane with Polyisocyanate Curative | EAF525-18 | Dartex Coatings Inc. |
| Fabric Backing | High Pile Sliver Knit | 733/0011 | Draper Knitting |
| Barrier Film | 6 mil Aromatic Polycarbonate Polyurethane Film | 137 Matte × 0.006" | Tuftane ETI |

TABLE 6

Process Variables

| Process Variable | Controlled Variable | Value | Notes |
|---|---|---|---|
| Midlayer Thickness | Applied (dry) weight, oz/yd$^2$ | 0.65 | |
| Drying (Dryer #1) | Temperature, °F./Dwell, s | 200/180 | |
| Liquid Adhesive Thickness | Applied (dry) weight, oz/yd$^2$ | 1.30 | |
| Drying (Dryer #2) | Temperature, °F./Dwell, s | 250/120 | |
| Heated Nip | Temperature, °F./Pressure, pli | 290/70 | Heat applied to lower nip roller depicted in FIG. I, only. |
| Heated Nip Roller Dwell | Contact Path Length, yds/ Line Speed, ypm | 0.52/6 | ~5 Seconds dwell. |

Table 7 below represents the results of physical testing performed on the composite barrier fabric manufactured as described above.

TABLE 7

Test Results

| Property | Value | Method |
|---|---|---|
| Weight, oz/yd$^2$ 23 ASTM D751 | 25 | ASTM D751 |
| Thickness, mm | 5.4 | ASTM D751 |
| Adhesion of Coating, pfi | 10 | ASTM D751 |
| Stretch, %, MD × CD | 9 × 12 | CFFA-15, 10# Load |
| Set, %, MD × CD | <1 × <1 | CFFA-15, 10# Load |
| Grab Tensile, lbf, MD × CD | 164 × 89 | ASTM D751 |
| Tongue Tear, lbf, MD × CD | 16 × 13 | ASTM D751 |
| Taber Abrasion, cycles to failure | >10,000 | ASTM D3389, H-18/1000 g |
| Taber Abrasion*, cycles to failure | 5000 | ASTM D3389, H-18/1000 g |
| Cured Wall Thickness*, mm | 3.1 | N/A |
| Epoxy Resin Demand*, oz/yd$^2$ | 89 | N/A |
| Flexural Strength*, psi (MD) | 7600 | ASTM D790 |
| Flexural Modulus*, psi (MD) | 250,000 | ASTM D790 |

*Unfilled epoxy resin saturated test plaques, cured under 5 psi dead load.

EXAMPLE 3

Lower thickness, fleece-backed composite fabrics useful for the cured-in-place lining of gravity and pressure-pipes, were produced using the apparatus and process shown in FIG. 1. Tables 8 and 9, which follow, specify the materials and process variables used.

TABLE 8

Materials

| Material | Description | Product Code | Supplier |
|---|---|---|---|
| Release Carrier | 2 mil Silicone-Coated Polyester Release Liner | 2MIL PET C/1/S EASY RELEASE | MPI Release LLC |
| Midlayer Barrier Coating Solution | Solution Compound of Aromatic Polyether Polyurethane | EAF535-1 | Dartex Coatings Inc. |
| Liquid Adhesive | Aqueous Compound of Aliphatic Polyurethane with Polyisocyanate Curative | EAF525-18 | Dartex Coatings Inc. |
| Fabric Backing | Polyester Fleece | 9534 | Polartec LLC |
| Barrier Film | 6 mil Aromatic Polycarbonate Polyurethane Film | 137 Matte × 0.006" | Tuftane ETI |

TABLE 9

Process Variables

| Process Variable | Controlled Variable | Value | Notes |
|---|---|---|---|
| Midlayer Thickness | Applied (dry) weight, oz/yd$^2$ | 0.65 | |
| Drying (Dryer #1) | Temperature, °F./Dwell, s | 200/180 | |
| Liquid Adhesive Thickness | Applied (dry) weight, oz/yd$^2$ | 1.30 | |
| Drying (Dryer #2) | Temperature, °F./Dwell, s | 250/120 | |
| Heated Nip | Temperature, °F./Pressure, pli | 290/70 | Heat applied to lower nip roller depicted in FIG. I, only. |
| Heated Nip Roller Dwell | Contact Path Length, yds/Line Speed, ypm | 0.52/6 | ~5 Seconds dwell. |

Table 10 below represents the results of physical testing performed on the composite barrier fabric manufactured as described above.

TABLE 10

Test Results

| Property | Value | Method |
|---|---|---|
| Weight, oz/yd$^2$ 23 ASTM D751 | 22 | ASTM D751 |
| Thickness, mm | 3.4 | ASTM D751 |
| Adhesion of Coating, pfi | 5.8 | ASTM D751 |
| Stretch, %, MD × CD | 2 × 23 | CFFA-15, 10# Load |
| Set, %, MD × CD | <1 × <1 | CFFA-15, 10# Load |
| Grab Tensile, lbf, MD × CD | 172 × 140 | ASTM D751 |
| Tongue Tear, lbf, MD × CD | 14 × 14 | ASTM D751 |
| Taber Abrasion*, cycles to failure | 9000 | ASTM D3389, H-18/1000 g |
| Cured Wall Thickness*, mm | 2.0 | N/A |
| Epoxy Resin Demand*, oz/yd$^2$ | 46 | N/A |

*Unfilled epoxy resin saturated test plaques, cured under 5 psi dead load.

EXAMPLE 4

This laboratory prepared example represents a relatively low weight and thickness composite fabric useful for protective fabric applications such as mattress covers where liquid barrier properties are critical as well as the properties of stretch and recovery.

Table 11 which follows, specifies the materials used.

TABLE 11

Materials

| Material | Description | Product Code | Supplier |
|---|---|---|---|
| Release Carrier | 2 mil Silicone-Coated BOPP Release Liner | 2MIL BOPP C/1/S | MPI Release LLC |
| Midlayer Barrier Coating Solution | Solution Compound of Aromatic Polyether Polyurethane | EAF535-1 | Dartex Coatings Inc. |
| Liquid Adhesive | Polyurethane solution adhesive | EA223A | Dartex Coatings Inc. |
| Fabric Backing | 2.8 oz. Polyester Interlock Knit | Unspecified | Unspecified |
| Barrier Film | 1 mil Aromatic PolyetherPolyurethane Film | DT 2050S | American Polyfilm Inc. |

The following laboratory procedure employed a standard office document laminator as a substitute for heated nip stations (two required) of a production scale apparatus.

Step 1: Cast midlayer compound onto release side of BOPP carrier to a target dry weight of 0.3 oz/yd$^2$ (~2 mils wet). Dried for 2' @ 200° F.

Step 2: Overcoated midlayer with EA223A adhesive to a target dry add-on of 0.7 oz/yd$^2$ (~3 wet mils). Dried for 1' @ 150° F.

Step 3: Carefully closed adhesive surface to knit substrate and passed through document laminator sandwiched between supporting paper carriers, on medium temperature setting.

Step 4: Laid out a sufficiently large section of barrier film on a flat surface and tensioned edges slightly to remove all wrinkles. Stripped away BOPP release carrier from fabric-supported midlayer and carefully closed to barrier film surface.

Step 5: Trimmed edges of sample before passing again through document laminator.

Step 6: Subjected sample to 350° F. for 15 s. to affect sufficient fusion of the barrier layer.

Table 12 below represents the results of physical testing performed on the composite barrier fabric prepared as described above.

TABLE 12

| Test Results | | |
|---|---|---|
| Property | Value | Method |
| Weight, oz/yd$^2$ | 4.9 | ASTM D751 |
| High Pressure Hydrostatic Resistance, psi | 115 | ASTM D751 |
| Adhesion of Coating, pfi | 9 | ASTM D751 |
| General Characteristics | Very soft handle with excellent stretch and recovery. | N/A |

The process described herein provides surprising utility considering the ease with which pre-formed barrier film of even relatively high thickness is added to an otherwise conventionally transfer coated barrier composite fabric. To date, thermoplastic PU films ranging from 1 mil to 12 mils in thickness have been successfully and conveniently added onto transfer coated composite fabric "intermediates" with little to no adjustment of process variables.

While the invention has been described in detail and with reference to specific examples thereof, it will be apparent to one skilled in the art that various changes and modifications can be made therein without departing from the spirit and scope thereof.

What is claimed is:

1. A composite fabric comprising:
a fabric backing;
an adhesive layer bonded to the fabric backing such that the fabric backing protrudes into and through the adhesive layer;
a midlayer barrier bonded to the fabric backing by the adhesive layer; and
an external barrier bonded to the midlayer barrier, wherein the external barrier consists essentially of a layer of a pre-formed polymeric film selected from the group consisting of an extruded thermoplastic polyurethane film, a natural or synthetic rubber file, a polyamide film and a polyolefin film,
wherein the composite fabric has a hydrostatic pressure resistance of at least 100 psi and is sufficiently flexible such that it can be formed into a tube and everted.

2. The composite fabric of claim 1, wherein the fabric backing is a knit, woven or non-woven fabric which is stretchable in at least one of a machine direction and a cross-machine direction.

3. The composite fabric of claim 1, wherein the adhesive layer comprises a polyurethane composition.

4. The composite fabric of claim 1, wherein the midlayer barrier comprises an aromatic polyether polyurethane composition.

5. The composite fabric of claim 1, further comprising at least one additional external barrier bonded to the external barrier, wherein the at least one additional external barrier consists essentially of a layer of a pre-formed polymeric film selected from the group consisting of an extruded thermoplastic polyurethane film, a natural or synthetic rubber film, a polyamide film and a polyolefin film.

6. The composite fabric of claim 1, wherein the hydrostatic pressure resistance is at least 150 psi.

7. The composite fabric of claim 1, wherein the hydrostatic pressure resistance is 100-200 psi.

8. The composite fabric of claim 1, which is tubular in form and suitable for use as a liner for cured-in-place pipe repair.

9. A process for producing the composite fabric of claim 1, said process comprising:
feeding a release carrier to a transfer coating line having at least two coating stations;
applying at only a single coating station a midlayer barrier coating solution to the release layer to form the midlayer barrier;
applying an adhesive to the midlayer barrier on the release layer;
applying the fabric backing to the adhesive on the midlayer barrier to form a first intermediate;
heating the first intermediate to form a second intermediate;
separating the release carrier from the second intermediate to form a third intermediate; and
providing the external barrier by applying a barrier film to the midlayer barrier of the third intermediate to form the composite fabric.

10. The process of claim 9, wherein the fabric backing is a knit, woven or non-woven fabric which is stretchable in at least one of a machine direction and a cross-machine direction.

11. The process of claim 9, wherein the adhesive comprises a polyurethane composition.

12. The process of claim 9, wherein the midlayer barrier comprises an aromatic polyether polyurethane composition.

13. The process of claim 9, wherein the external barrier comprises a layer of a pre-formed polymeric film selected from the group consisting of an extruded thermoplastic polyurethane film, a polyester film, a natural or synthetic rubber film, a polyamide film and a polyolefin film.

14. The process of claim 9, further comprising bonding at least one additional external barrier to the external barrier.

15. The process of claim 9, wherein the hydrostatic pressure resistance is at least 150 psi.

16. The process of claim 9, wherein the hydrostatic pressure resistance is 100-200 psi.

17. A liner for cured-in-place pipe repair, said liner comprising the composite fabric of claim 1 in a tubular form.

18. A cured-in-place pipe repair method comprising:
forming a tubular liner from the composite fabric of claim 1, such that the fabric backing constitutes an external surface of the tubular liner;
applying a curable resin to the fabric backing to provide a coated tubular liner;

inserting the coated tubular liner into a pipe to be repaired; and maintaining contact between the coated tubular liner and an internal surface of the pipe while the resin cures such that the pipe is repaired.

19. The method of claim 18, wherein the fabric backing is a knit, woven or non-woven fabric which is stretchable in at least one of a machine direction and a cross-machine direction.

20. The method of claim 18, wherein the adhesive comprises a polyurethane composition.

21. The method of claim 18, wherein the midlayer barrier comprises an aromatic polyether polyurethane composition.

22. The method of claim 18, wherein the external barrier comprises a layer of a pre-formed polymeric film selected from the group consisting of an extruded thermoplastic polyurethane film, a polyester film, a natural or synthetic rubber film, a polyamide film and a polyolefin film.

23. The method of claim 18, further comprising bonding at least one additional external barrier to the external barrier.

24. The method of claim 18, wherein the hydrostatic pressure resistance is at least 150 psi.

25. The method of claim 18, wherein the hydrostatic pressure resistance is 100-200 psi.

* * * * *